Oct. 3, 1939.  C. C. PAGE  2,175,089
MACHINE FOR MAKING CANDY CANES
Filed Jan. 7, 1939  3 Sheets-Sheet 1
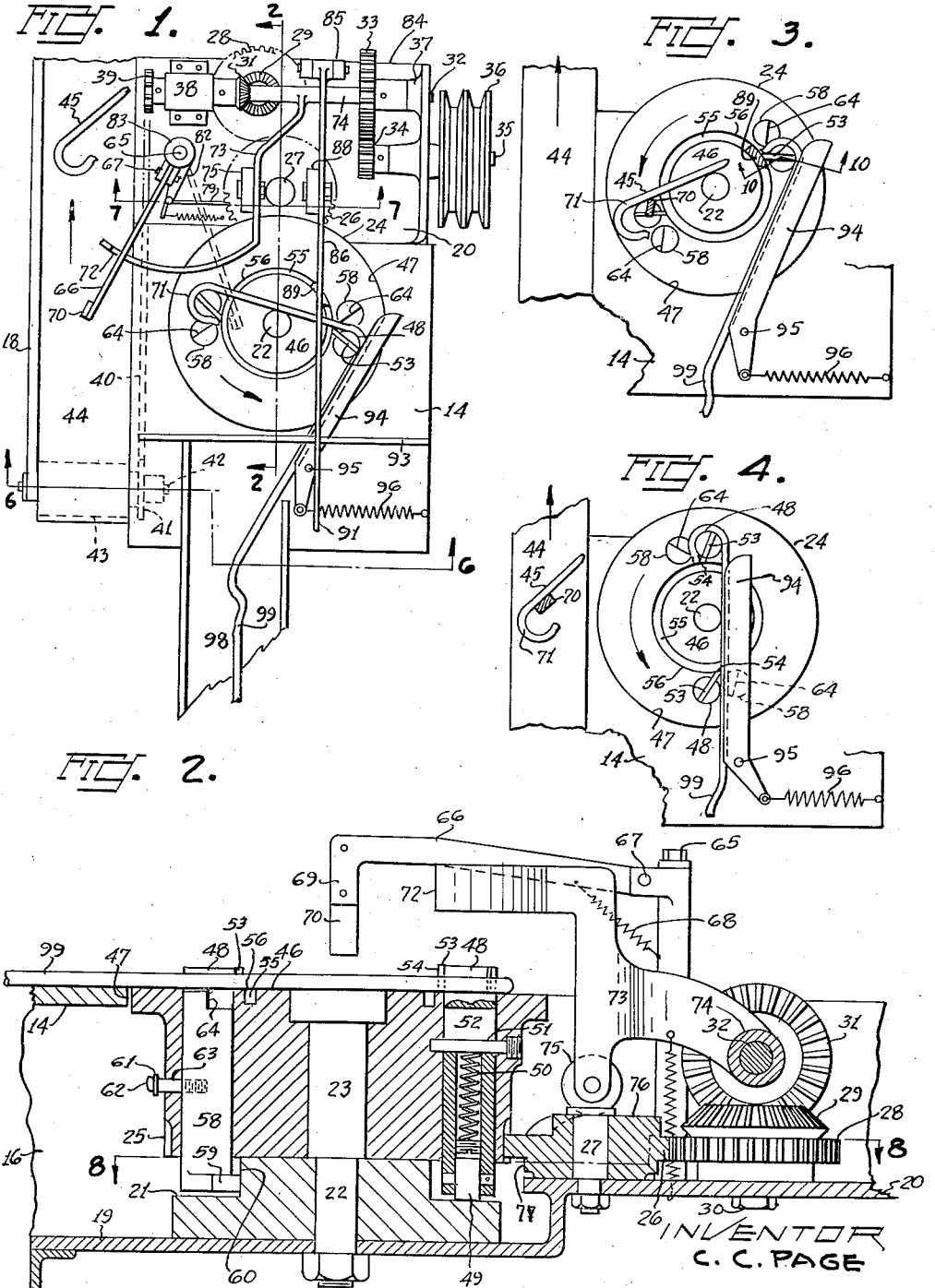
INVENTOR
C. C. PAGE
BY E. F. Nichenbend
ATTORNEY

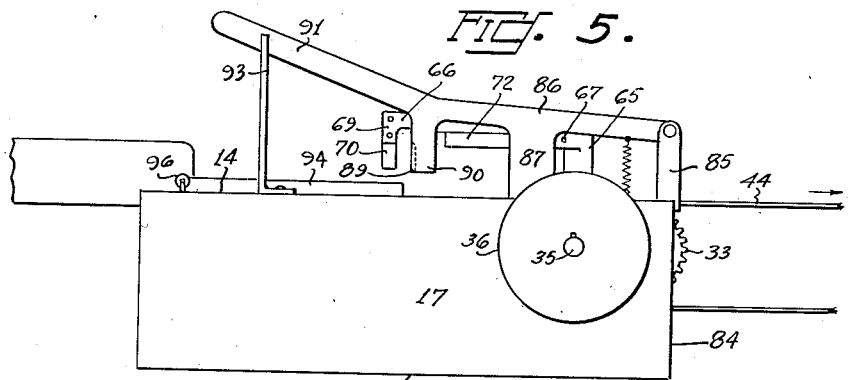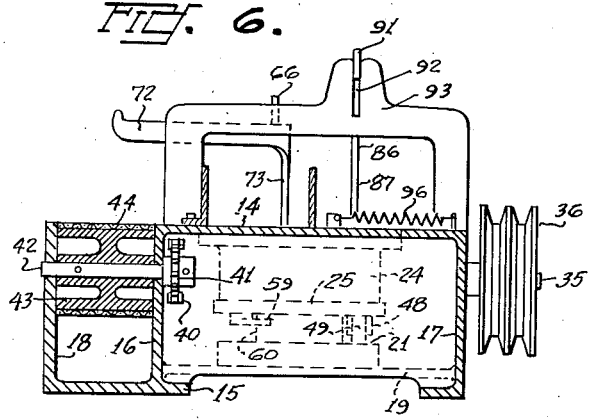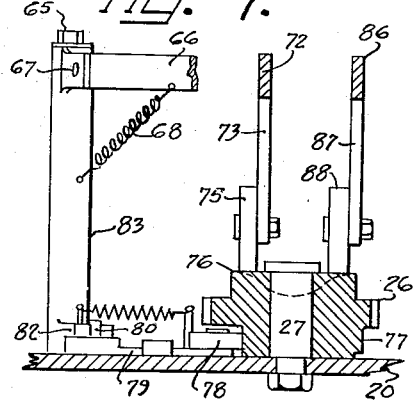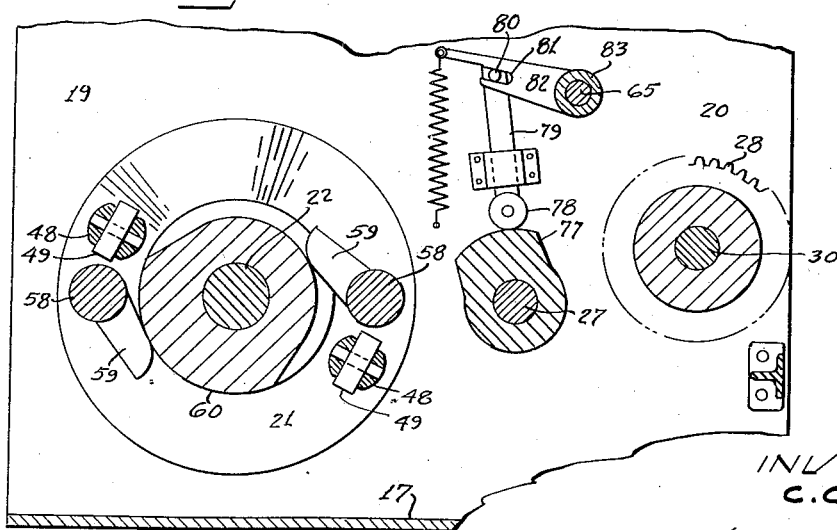

Oct. 3, 1939.   C. C. PAGE   2,175,089
MACHINE FOR MAKING CANDY CANES
Filed Jan. 7, 1939   3 Sheets-Sheet 3
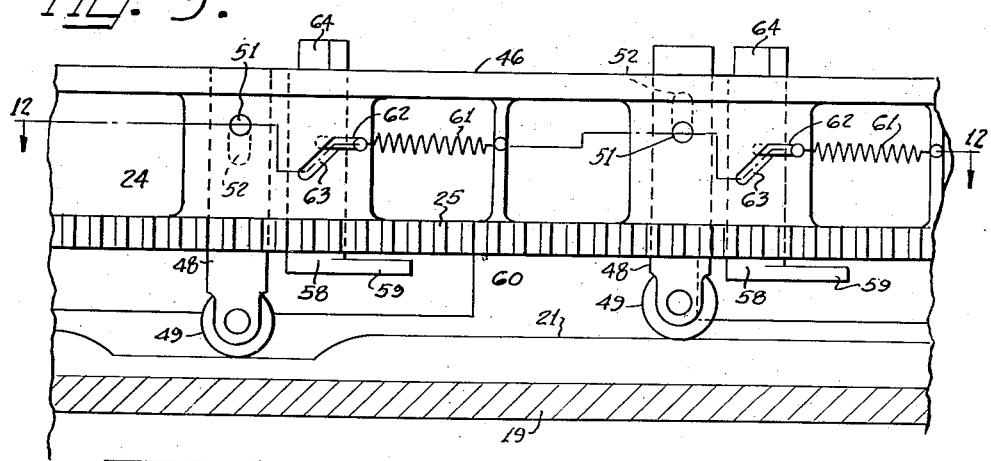

Patented Oct. 3, 1939

2,175,089

UNITED STATES PATENT OFFICE 2,175,089

MACHINE FOR MAKING CANDY CANES

Clarence C. Page, Portland, Oreg., assignor to William B. and M. H. Wright Candy Company, Portland, Oreg., a corporation of Oregon Application January 7, 1939, Serial No. 249,757

4 Claims. (Cl. 107—4)

This invention relates generally to the candy making art, and particularly to a machine for making candy canes.

The main object of this invention is to construct a machine of the class described whereby candy canes such as sell normally for one cent can be profitably made.

The second object is to construct a machine which will produce canes rapidly and uniformly and with a very low percentage of broken canes.

I accomplish these and other objects in the manner set forth in the following specification as illustrated in the accompanying drawings, in which:

Fig. 1 is a fragmentary plan of the machine.

Fig. 2 is a section taken along the line 2—2 in Fig. 1.

Fig. 3 is a fragmentary plan of the bending turret showing the cane just as it has been severed.

Fig. 4 is a view similar to Fig. 3 showing the cane ejected from the turret onto the discharge conveyor.

Fig. 5 is a side elevation of the machine.

Fig. 6 is a section taken along the line 6—6 in Fig. 1.

Fig. 7 is a section taken along the line 7—7 in Fig. 1.

Fig. 8 is a section taken along the line 8—8 in Fig. 2.

Fig. 9 is a developed view of the turret and cams.

Fig. 10 is a section taken along the line 10—10 in Fig. 3.

Fig. 11 is a fragmentary perspective view showing the forming bar drawn up to show the cutter blade and the recess in the table.

Fig. 12 is a section taken along the line 12—12 in Fig. 9.

Fig. 13 is a perspective view of the clamping post.

Similar numerals refer to similar parts throughout the several views.

Referring in detail to the drawings, there is shown the table 14 which is supported by a base 15 by means of the side walls 16 and 17. A wall 18 is also formed on the base 15 to support the discharge conveyor section.

Between the walls 16 and 17 is mounted the floor plate 19 and the bench 20. On the floor plate 19 is secured the stationary cam 21 by means of the shouldered bolt 22 on whose upper end 23 is rotatably mounted the turret 24 on whose lower edge is formed a gear 25 which meshes with an intermediate gear 26 which is rotatably mounted on the bolt 27 which in turn is mounted on the bench 20. The gear 26 meshes with the gear 28 which is integral with the bevel gear 29. The gears 28 and 29 are rotatable on the bolt 30 which is mounted on the bench 20. The bevel gear 29 meshes with the bevel gear 31 which is pinned to the shaft 32.

On the shaft 32 is secured a spur gear 33 which meshes with the pinion 34 which is secured on the shaft 35 on which is also secured the V-belt pulley 36. The shaft 32 is supported in the journals 37 and 38 and has secured on one end thereof a sprocket wheel 39 around which passes a chain 40 which passes around the sprocket wheel 41 which in turn is mounted on the shaft 42 of the conveyor roll 43 around which passes the conveyor belt 44 by means of which the canes 45 are moved to the packing table.

Rotatably mounted on the end 23 of the bolt 22 is a turret 24 on whose top 46 the cane forming operation is performed. An opening 47 is formed in the table 14 to receive the top 46 of the turret 24. The top 46 is flush with the upper side of the table 14.

In the turret 24 are mounted the vertically movable but not rotatable forming posts 48. These posts are diametrically opposite and each has its lower end provided with the roller 49 which rides upon the cam 21, toward which it is urged by pressure of the spring 50 which reacts against the pin 51 which extends through the slot 52 in the post 48.

Each post 48 has mounted in the top thereof an anvil 53 having a substantially vertical cutting edge 54. The turret 24 is provided with an annular groove 55 whose outer edge 56 coincides substantially with the cutting edge 54. The turret 24 is provided with a vertical slot 57 which permits the anvil 53 to pass downwardly into the turret 24.

In the turret 24 are also mounted a pair of clamping posts 58 on whose lower ends are formed the arms 59 which are held into engagement with the cam 60 by means of the spring 61 which is attached to the outer end of the pin 62 which projects radially from the post 58 through the inclined slot 63 so that a somewhat spiral action is imparted to the post 58 in order that it may rotate as it rises or falls.

The upper end 64 of each post 58 is cut away substantially as shown in Fig. 13.

Mounted on the bench 20 is a standard 65 on whose upper end is hinged an ejector arm 66 on the pin 67. The arm 66 is urged downwardly by means of a spring 68. The ejector arm 66 has a downturned end 69 provided with a cane engaging tip 70 which contacts the handle 71 of the cane 45 and moves it off of the turret 24. The arm 66 rests upon the curved track 72 which is formed on the arm 73 whose hub 74 pivots on the shaft 32. To the arm 73 is attached a roller 75 which rests upon the cam 76 which is integral with the intermediate gear 26.

On the underside of the gear 26 is formed an ejector cam 77 which engages the roller 78 of the spring urged plunger 79 whose pin 80 engages the slot 81 in the lever 82 which projects from the hub 83 which is rotatable on the standard 65.

On the rear end 84 is mounted a standard 85 to which is hinged the cutter arm 86 on whose downwardly extending portion 87 is attached a roller 88 which is also adapted to ride upon the the cam 76 and to be actuated thereby.

The cutter arm 86 has depending therefrom a cutter blade 89 which is adapted to register with the cutting edge 54 of the anvil 53 as the anvil 53 travels past the blade 89. The lower end 90 of the blade 89 is curved to conform to the annular groove 55.

In order to provide lateral stability to the cutter arm 86 its handle 91 is held in a slot 92 in the guide 93. A shoe 94 is hinged on the pin 95 which is supported by the table 14. A spring 96 urges the shoe 94 toward the turret 24. The face 97 of the shoe 94 is curved somewhat as shown in Fig. 10.

It is desirable to provide a chute 98 on a level with the table 14. Along this chute 98 there is fed candy bar stock 99 which is warm enough to be easily formed without breaking. It is assumed that an operator has drawn this stock to a diameter suitable for the purpose.

The operation of the device is as follows:

For the purpose of illustration it is assumed that the parts are in the position shown in Fig. 1 in which the forming posts 48 are in a raised position where they are held by the cams 21. It will be noted that the handle 71 of the cane is bent around one post 48 while the end of the cane about to be severed is bent around the second post 48. At this juncture the cutter 89 is lowered and as the turret 24 revolves the anvil cutting edge 54 sweeps past the cutter 89 severing the cane from the bar stock 99.

While this is taking place the track 72 descends under the action of the cam 76 moving the tip 70 downwardly to the position shown in dotted lines in Fig. 1. In the next movement the ejector cam 77 causes the arm 66 to swing to the position shown in full lines in Fig. 1 thereby moving the cane 45 onto the conveyor belt 44 from whence it travels to the packing tables.

It must be understood that before this can take place one of the forming posts 48 must be drawn downwardly to permit the tip 70 to function.

Once the cane 45 is removed from the turret 24 a new cane is started substantially as follows:

First, the clamping post 58 nearest the shoe 94 rotates sufficiently to cause the end 64 to engage the bar 99 and hold it as it moves around to the position shown in Fig. 1, that is, to the position of completing the next cane.

From the foregoing, it will be seen that the operation is repeated in rapid succession one cane being started while the other cane is being finished. With the use of this machine it is possible to manufacture small sized candy canes at a profit.

I claim:

1. A candy cane machine having a turret, forming posts projectable from said turret, means for clamping candy bar stock to said posts while in projected positions, and means for severing said bar stock as it revolves upon said turret.

2. A candy cane machine consisting of a turret having forming posts projectably mounted thereon, clamping elements associated with said forming posts and means for cutting candy bar stock as it revolves on said turret.

3. A candy cane machine having in combination a revolvable turret, forming posts mounted on said turret adapted to be projected therefrom in parallelism with the turret axis, clamping means for holding candy bar stock against said posts, a shoe for guiding said candy bar stock around said forms and means for severing the canes as they are formed.

4. In a machine of the class described the combination of a revolvable turret with forming posts slidably projectable therefrom, a clamping post slidably and rotatably projectable from said turret, a shoe for guiding candy stock to said forming posts, means for severing a cane when formed and an ejector adapted to move across the face of said turret and remove said cane after it is severed.

CLARENCE C. PAGE.